United States Patent [19]

Matsuo

[11] Patent Number: 5,533,741
[45] Date of Patent: Jul. 9, 1996

[54] BICYLCE WITH A DOUBLE POWER TRAIN

[75] Inventor: Fumitaka Matsuo, Uda-gun, Japan

[73] Assignee: Matsuo Denshi Kabushiki Kaisha, Nara, Japan

[21] Appl. No.: 445,972

[22] Filed: May 22, 1995

[30] Foreign Application Priority Data

May 24, 1994 [JP] Japan .................. 5-005669 U

[51] Int. Cl.⁶ ..................................... B62M 9/00
[52] U.S. Cl. ................ 280/238; 280/237; 280/261; 74/594.2
[58] Field of Search ................ 280/259, 260, 280/261, 236, 237, 238; 74/594.2, 594.1

[56] References Cited

U.S. PATENT DOCUMENTS

| | | | |
|---|---|---|---|
| 410,751 | 9/1889 | Davis | 280/238 |
| 443,938 | 12/1890 | Fleming | 280/238 |
| 476,157 | 5/1892 | Moore et al. | 280/238 |
| 510,227 | 12/1893 | Acklin | 280/238 |
| 644,411 | 2/1900 | Deafenbaugh | 280/238 X |
| 4,790,552 | 12/1988 | Lain | 280/237 X |
| 5,435,583 | 7/1995 | Foster, Jr. | 280/260 X |

*Primary Examiner*—Eric D. Culbreth
*Assistant Examiner*—F. Zeender
*Attorney, Agent, or Firm*—Jordan and Hamburg

[57] ABSTRACT

A bicycle includes a first power train to propel the bicycle forward, a second power train to propel the bicycle forward and backward, and means for setting each of the first and second power trains from withdrawn mode into operative mode or vice versa. With this arrangement, the bicycle can be used for different purposes.

13 Claims, 3 Drawing Sheets

BICYLCE WITH A DOUBLE POWER TRAIN

BACKGROUND OF THE INVENTION

1. Field of the Invention

This invention relates to a bicycle, and more particularly, a bicyle having a double power train which can propel the bicycle forward with one power train, and forward and backward with the other power train for various purposes such as bicycle games and physical exercises, in addition to normal running.

2. Description of the Prior Art

There are hitherto a bicycle of various types, such as a normal type, racing type, off-road type and game type. However, the bicyle of these types is unlikely to be used for an unexpected purpose. That is, when the bicyle is designed for a daily use, it is unlikely to be used for a bicycle game such as a so-called cycle soccer and a cycle-cross, in which a special function is required.

A general structure of a commonly used bicyle will be described hereinafter in conjunction with FIGS. 1 to 3, in which elements of the present invention are also shown.

A sprocket wheel 3 has a larger diameter and is fixed to a driving crank axle (not shown) which is positioned at a lower and center portion of a body 1. A sprocket wheel 4 has a smaller diameter and is fixed to a boss member 13 of a rear tire 2 via a ratchet mechanism (not shown). An endless chain 5 is wound around the sprocket wheel 4 of the rear tire 2 and the sprocket wheel 3 on the driving crank axle. Pedals 9 and 9' mounted to both sides of the driving crank axle are rotated by a rider to transmit propelling force to the rear tire 2 via the driving crank axle and the chain. In this regard, the rachet mechanism transmits the force from the sprocket wheel 3 to the rear tire 2, when the pedals 9, 9' are rotated in such a direction that the bicycle is propelled forward via the rear tire 2. Contrarily, when the pedals 9 and 9' are rotated in the reverse direction, the force is not transmitted to the rear tire 2 with the ratchet mechanism. As a result, the rear tire 2 comes into an idling state.

With the above structure, the bicycle is not propelled backward by rotation of the pedals 9 and 9', since the ratchet mechanism intervenes the transmitting of the propelling force. Therefore, when the bicycle, which can be propelled forward and backward by the force effected by the pedals 9 and 9', is needed in the cycle soccer, cycle-cross, it is necessary to prepare the bicycle of a different type.

SUMMARY OF THE INVENTION

In view of such a problem of the prior art, an object of the present invention is to provide a bicyle which can be propelled forward, and forward and backward for various purposes such as a bicycle game and physical exercise, in addition to daily use.

The above object of the present invention can be accomplished by providing a bicycle which includes a first power train to propel the bicyle forward, a second power train to propel the bicycle forward and backward, and means for setting each of the first and second power trains from inoperative mode into operative mode or vice versa. Whereby, it is possible to use the bicycle for various purposes.

With the above arrangement, the first power train is selectively set into operative mode to propel the bicycle forward, while the second power train is set into inoperative mode. On the contrary, the second power train is selectively set into operative mode to propel the bicycle forward and backward, while the first power train is set into inoperative mode.

The above, and other objects, features and advantages of the present invention will become apparent from the detailed description thereof read in conjunction with the accompanying drawings.

BRIEF DESCRIPTION OF THE DRAWINGS

FIG. 4 is an enlarged partial sectional view of an engaging mechanism in accordance with one embodiment of the present invention.

FIG. 5 illustrates an appearance of the engaging mechanism of FIG. 4.

DETAILED DESCRIPTION OF THE PREFERRED EMBODIMENTS

Figure 1:
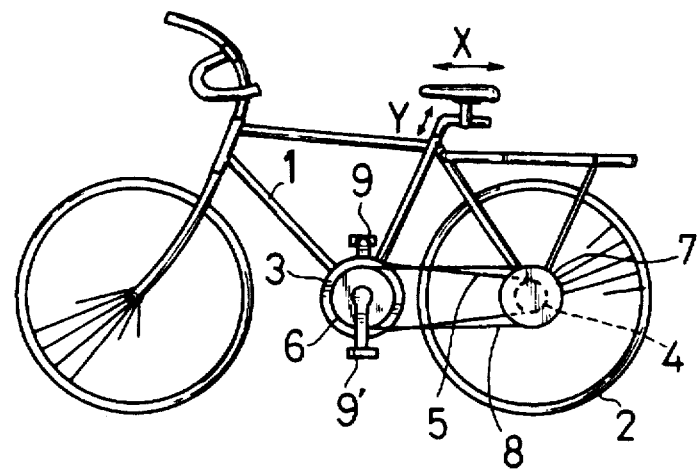
FIG. 1 is a side view of a bicycle in accordance with the present invention.
Figure 2:
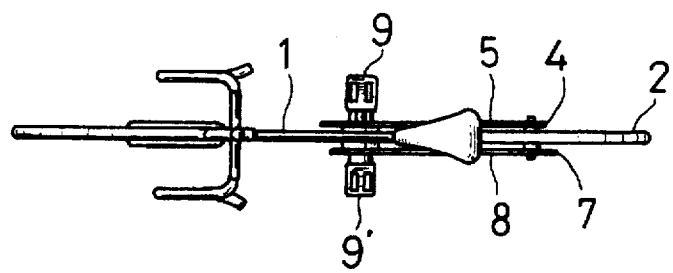
FIG. 2 is a plan view of the bicycle of FIG. 1.

Referring to FIGS. 1 to 6, a bicycle includes a body 1, a front tire, and a rear tire 2. A seat is slidable in the directions of arrows X of FIG. 1 on an angled seat post which in turn slides in the directions of arrows Y of FIG. 1 with regard to the body 1 to enable a rider to take a preferable riding position. A bearing portion 14 is positioned at a center and lower portion of the body 1 between the front and rear tires. A driving crank axle 15 is rotatably inserted into the bearing portion 14, and pedals 9 and 9' are respectively mounted to both ends of the crank axle 15. The driving crank axle 15 is provided at one end in the right side of the bicycle, when the rider rides thereon, with a first engaging mechanism A (details thereof will be described later), through which a first driving-side sprocket wheel 3 of a larger diameter is rotatably mounted to the one side of the driving crank axle 15.

Figure 3:
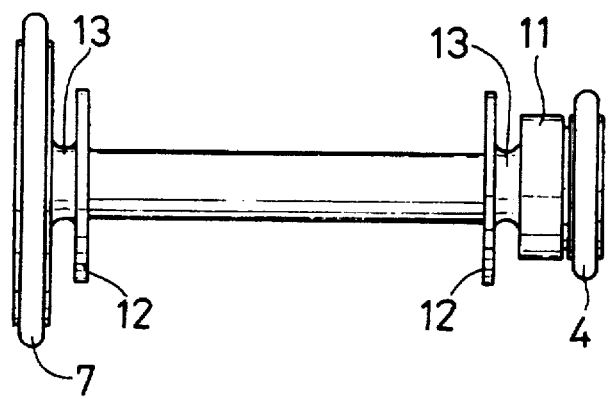
FIG. 3 is a schematic enlarged view of a driven crank axle of the present invention.

Referring to FIG. 3, a boss member 13 is positioned around a driven crank axle (not shown). A first driven-side sprocket wheel 4 of a smaller diameter is mounted to the boss member 13 through a ratchem mechanism such that the both sprocket wheels 3 and 4 are positioned in the same side. A first endless chain 4 is wound around the first driving-side sprocket wheel 3 and the first driven-side sprocket wheel 4. With this arrangement, when the first engaging mechanism A is in an engaging state, the rear tire 2 is rotated in such a direction to propel the bicycle forward by rotation of the pedals 9 and 9'.

A second engaging mechanism A' is mounted to the other side of the driving crank axle 15. A second driving-side sprocket wheel 6 is mounted to the driving crank axle 15 via the second engaging mechanism A'. A second driven-side sprocket wheel 7, having substantially the same diameter as that of the second driving-side sprocket wheel 6, is mounted to the opposite end of the boss member 13 in such a manner as to be rotated together with the rear tire 2. A second endless chain 8 is wound around the sproket wheels 6 and 7. The propelling force effected by the rotation of pedals 9 and 9' is transmitted to the rear tire 2 without any intervention of the ratchet mechanism 11 via the second driving-side sprocket wheel 6 and the second driven-side sprocket wheel 7, the rotational ratio of which is 1:1. In this regard, it is not necessary to set that rotational ration exactly to 1:1, provided that the ratio is not set at a a relatively extreme degree which will be unsuitable for cycle soccer or the like. Thus, the rear tire 2 can be rotated in both directions in accordance with the rotational direction of the driving crank axle 15.

Figure 6:
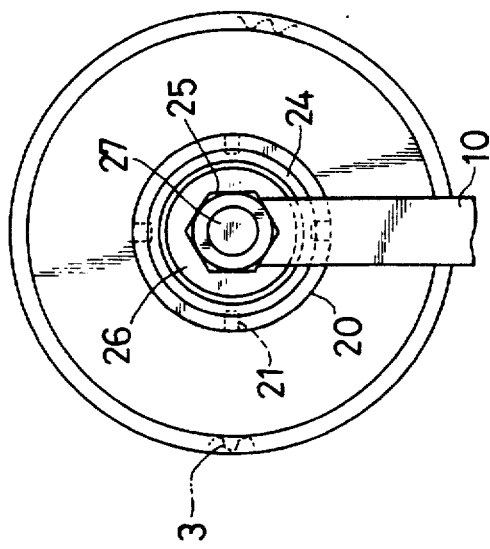
FIG. 6 is a schematic side elevation of the engaging mechanism of FIG. 4.
Figure 7:
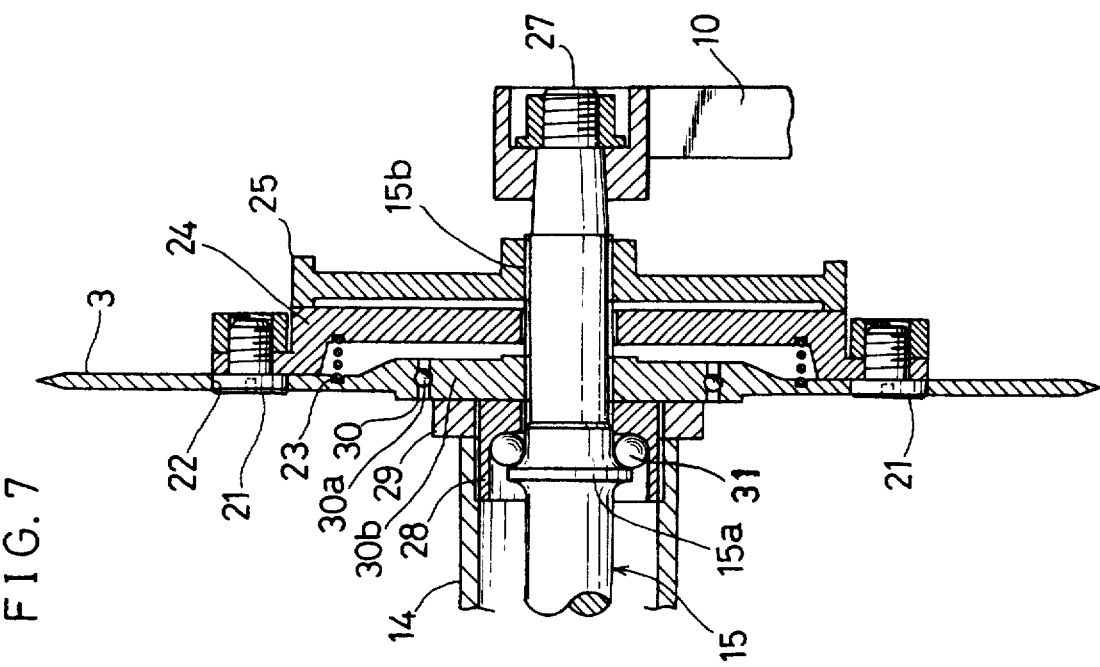
Figure 6:
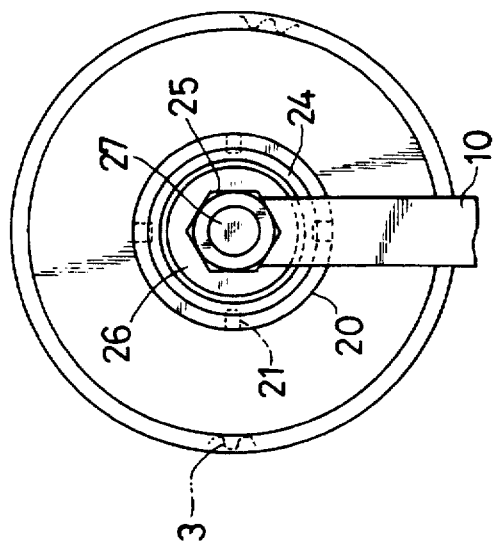

FIGS. 4, 5 and 6 respectively illustrate the engaging mechanisms in detail. In this regard, since the first and second engaging mechanisms A and A' are structurally identical to each other, corresponding or identical parts; have been given the same reference numerals primed. A crank arm 10 is provided at one end thereof with the pedals 9 and 9', and mounted at the other end to the driving crank axle 15. The driving crank axle 15 is rotatably inserted into the bearing portion 14 as described above. The first driving-side sprocket wheel 3 is fitted around a base portion of an extension 27 of the driving crank axle 15 extending sidewards from the bearing portion 14. A ball bearing 19 with two sets of freely rolling balls therein is mounted to an inwardly facing periphery of the first driving-side sprocket wheel 3 such that the first driving-side sprocket wheel 3 can be freely rotated around the driving crank axle 15.

An outwardly threaded portion is provided on the outer periphery of the extension 27 of the driving crank axle 15. A bush member 16 is provided on the outer periphery thereof with an outwardly threaded portion 18 and a set of spline grooves 17, the former being formed in a substantially half portion extending from the outer end of the bush member, and the later being formed along the axis of the driving crank axle 15 in the residual portion. The inner periphery of the bush member 16 is provided with an inwardly threaded portion, through which the bush member 16 is tightly threaded into the driving crank axle 15. The bush member 16 forces the balls of the ball bearing 19 into such a state that the balls are freely rotatable with regard to the driving crank axle 15, by the inner end of the bush member 16.

An engaging member 24 is formed into a dish shape and has an axially defined hole, through which the extension 27 of the driving crank axle 15 is inserted, and slides along the spline grooves 17 of the bush member 16 in the axial direction of the driving crank axle 15, while being rotatable together with the bush member 16. A plurality of spaced engaging protrusions 21 protrude towards the first driving sprocket wheel 3 from a peripheral portion 20 of the engaging member 24 in such a manner as to respectively engage corresponding engaging holes 22 defined in the first driving-side sprocket wheel 3 when they are set in an engaging state. The engaging member 24 is urged in such a direction as to be spaced apart from the first driving-side sprocket wheel 3 via coil springs 23 interposed between the engaging member 24 and the sprocket wheel 3.

A tightening member 25 is threaded onto the outwardly threaded portion 18 of the bush member 16 such that an abutting periphery 26 of the tightening member 25 abuts against the outer side of the engaging member 24 and presses the same in such a manner as to secure the engaging relationship between the engaging member 24 and the sprocket wheel 3. The tightening member 25 is provided at the outer end thereof with a detent concave or detent protrusion of various shapes such as rectangular and hexagonal shapes, to which a hand tool such as a spanner and a box wrench is positioned so as to facilitate tightening of the engaging member 24 via the tightening member 25.

The crank arm 10, the outer end of which is provided with the pedal 9, is dismountably fixed to the outer end of the extension 27 via a suitable conventional means such that the driving crank axle 15 is directly rotated by the rotation of the crank arm 10 in a fixed state. A reference numeral 12 of FIG. 3 represents a hub.

The operation of the bicycle in accordance with the present invention will be explained in detail hereinafter.

As an initial state, both the first and second engaging mechanisms A and A' are in the disengaging state. To use the bicycle for the normal riding, the tightening member 25 of the first engaging mechanism A is slided towards the engaging member 24 in accordance with the pitch of the outwardly threaded portion of the driving crank axle 15 by rotating the tightening member 25 with the spanner or the like. Thereby, the engaging member 24 subsequently moves along the spline grooves 17 towards the first driving-side sprocket wheel 3, forcing against the spring force of the coil springs 23. Then, the engaging protrusions 21 on the peripheral portion 20 of the engaging member 24 are positioned so as to respectively face the corresponding engaging holes 22 of the sprocket wheel 3 by adjusting the crank arm 10 or the sprocket wheel 3. The tightening member 25 is further moved in the same manner as above. Then, the engaging protrusions 21 are respectively inserted into the engaging holes 22, and the sprocket wheel 3 is integrally connected to the crank arm 10 via the driving crank axle 15. Thus, the engaging operation of the first engaging mechanism A is completed. In this state, the propelling force can be transmitted to the first driving-side sprocket wheel 3 from the crank axle 15.

On the other hand, when the second engaging mechanism A' is in the disengaging state as described above, in which the tightening member 25 is positioned at the outermost portion of the extension 27 of the driving crank axle 15, the engaging protrusions 21 of the engaging member 24 are released from the engaging relationship to the engaging holes 22 of the second driving sprocket wheel 6 such that the propelling force can not be transmitted from the crank axle 15 to the sprocket wheel 6. In this state, when the pedals 9 and 9' are rotated in such a direction to propel the bicycle forward, the first driving-side sprocket wheel 3 is rotated via the driving crank axle 15. Then, the propelling force is transmitted to the rear tire 2 via the first endless chain 4, the first driven-side sprocket wheel 4, the boss member 13 and the ratchet mechanism 11. On the contrary, when the pedals 9 and 9' are rotated in such a direction to propel the bicycle backward, the force is not trasmitted to the rear tire 2 by the function of the ratchet mechanism 11. Thus, it is possible to use the bicycle for the normal riding.

Next, the description of the second engaging mechanism A', when it is in the engaging state, will be made hereinafter.

From the initial state of the first and second engaging mechanisms A and A' as described above, the second engaging mechanism A' is operated into the engaging state in the same manner as described above. Since the second driving-side sprocket wheel 6 is integrally connected to the crank arm 10 and subsequently to the driving crank axle 15, and the second driven-side sprocket wheel 7 is connected to the boss member 13 without the intervention of the ratchet mechanism 11, the propelling force effected by the pedals 9 and 9' can be transmitted to the rear tire 2, when the pedals 9 and 9' are rotated in the both directions. Thus, the bicycle can be propelled forward and backward by means of the rotation of the pedals 9 and 9' for physical exercises, bicycle games, or the like.

Figure 7:
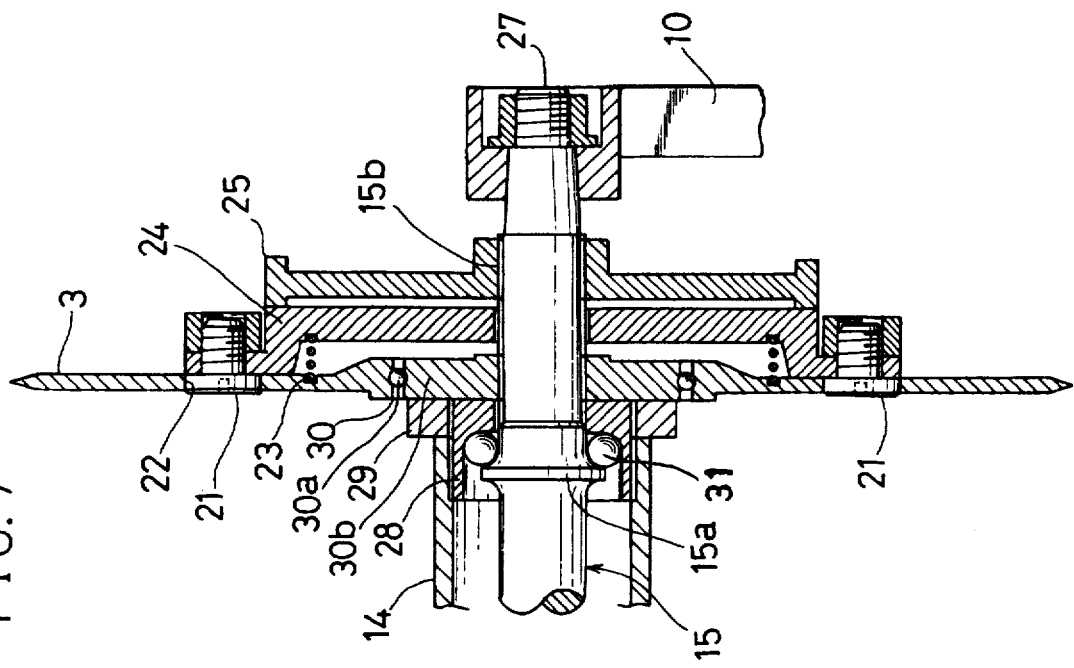
FIG. 7 is a cross section of the engaging mechanism in accordance with another embodiment of the present invention.

Another embodiment of the engaging mechanism is illustrated in FIG. 7. A ball pressing member 28 is threaded into the bearing portion 14 of the body 1 such that balls 31 are pressed by the ball pressing member 28 and an annular protrusion 15a of the driving crank axle 15 by tightening the ball pressing member 28. An annular collar 29 is threaded onto the ball pressing member to securely support the first driving-side sprocket wheel 3 by contacting a side of the sprocket wheel 3. The first driving-side sprocket wheel 3 includes a ball bearing 30 which in turn includes balls 30a and a base portion 30b. The base portion 30b is threaded onto the outwardly threaded portion 15b of the extension 27 of the driving crank axle 15, and the balls 30a are positioned on a periphery of the base portion 30b such that the first driving-side sprocket wheel 3 is rotatabe around via the ball bearing 30.

The engaging member 24 is slidably fitted to the driving crank axle 15 via the outwardly threaded portion 15b. A plurality of bolts, as the engaging protrusions 21, protrude towards the first driving-side sprocket wheel 3 from a peripheral portion of the engaging member 24 in such a manner as to respectively engage the corresponding engaging holes 22 defined in the first driving-side sprocket wheel 3. The coil springs 23 are provided in such a manner as to force the sprocket wheel 3 and the engaging member 24 apart from each other.

The tightening member 25 secures the engaging relationship between the sprocket wheel 3 and the engaging member 24. As in the above embodiment, the second engaging mechanism A' is structurally identical to the first engaging mechanism A, the detail description will be omitted. However the dimension of each part may be changed in accordance with a particular case. The engaging mechanism of this arrangement can be manufactured such that the length thereof in the axial direction can be smaller than that of the above arrangement.

In the both embodiments, the tightening member 25 may include a magnetic portion, while the engaging member 24 is made of iron or the like, such that the tightening member 25 can attract the engaging member 24 to maintain suitable disengaging relationship therebetween. Further, it is not necessary that the engaging holes 22 pass through the engaging member 24. In addition, although a plurality of engaging protrusions and holes are arranged in the bothe embodiments, one engaging protrusion and one engaging hole may be sufficiently function.

It is to be noted that, when the both engaging mechanisms A and A' are operated into the engaging state, and the rotational ratios thereof are different from each other, these engaging mechanisms A and A' may not properly function, as described above. On the contrary, when they are in the disengaging state, the first and second driving-side sprocket wheels 3 and 6 are freely rotatable with regard to the driving crank axle 15. As a result, it is unlikely that the bicycle will be used for actual use.

When the first and second engaging mechanisms are associated with each other via an interlocking means or the like, the setting operation may be effected at one time by a relatively easy manner.

Further, the engaging mechanism of the present invention enables a person to setting the mode with a relatively simple tool. In addition, since the parts of the first and second engaging mechanisms are identical to each other, a number of parts can be reduced, thus omitting a troublesome manufacturing process and reducing the manufacturing cost.

This specification is by no means intended to restrict the present invention to the preferred embodiments set forth therein. Various modifications to the inventive bicycle, as described herein, may be made by those skilled in the art without departing from the spirit and scope of the present invention.

What is claimed is:

1. A bicycle comprising:

a first power train for propelling said bicycle forward;

said first power train including a driving crank axle, a first driving-side sprocket wheel, and means for rotatably mounting said first driving-side sprocket wheel to said driving crank axle;

said first power train further including a driven crank axle, a first driven-side sprocket wheel, a ratchet means for ratchetably coupling said first driven-side sprocket wheel to said driven crank axle, and a first endless chain wound around said first driving-side sprocket wheel and said first driven-side sprocket wheel;

a second power train for propelling said bicycle forward and backward; and mode setting means for setting each of said first and second power trains from a withdrawn mode into an operative mode and vice versa, whereby said bicycle is usable for different purposes.

2. The bicycle as set forth in claim 1, wherein said mode setting means comprises:

said first driving-side sprocket wheel defining an engaging hole, an engaging member slidably mounted on said driving crank axle to allow said engaging member to slide in the axial direction of said driving crank axle, an engaging protrusion provided on said engaging member for engaging said engaging hole and thereby setting said first power train into said operative mode, a tightening member slidably mounted to said driving crank axle to permit slidable motion in the axial direction of said driving crank axle to press said engaging member into said driving-side sprocket wheel and secure engaging relationship between said first driving-side sprocket wheel and said engaging member by engagement of said engaging protrusion with said engaging hole.

3. The bicycle as set forth in claim 1, wherein said means for rotatably mounting includes a ball bearing mounted to said first driving-side sprocket wheel to allow said first driving-side sprocket wheel to rotate upon said driving crank axle.

4. The bicycle as set forth in claim 2, wherein a spring member is provided between said first driving-side sprocket wheel and said tightening member to force said first driving-side sprocket wheel and said tightening member apart from each other.

5. The bicycle as set forth in claim 1, wherein said second power train comprises:

a second driving-side sprocket wheel;

means for rotatably mounting said second driving-side sprocket wheel on said driving crank axle;

a second driven-side sprocket wheel mounted to said driven crank axle; and a second endless chain wound around said second driving-side sprocket wheel and said second driven-side sprocket wheel.

6. The bicycle as set forth in claim 5, wherein said mode setting means comprises:

said second driving-side sprocket wheel defining an engaging hole, an engaging member slidably mounted to said driving crank axle to permit slidable movement in the axial direction of said driving crank axle, an engaging protrusion provided on said engaging member for engaging said engaging hole and thereby setting said second power train into said operative mode; and a tightening member slidably mounted to said driving crank axle to allow slidable motion in the axial direction of said driving crank axle to press said engaging member into said second driving-side sprocket wheel and secure engaging relationship between said second driving-side sprocket wheel and said engaging member by engagement of said engaging protrusion with said engaging hole.

7. The bicycle as set forth in claim 5, wherein said means for rotatably mounting include a ball bearing mounted to said second driving-side sprocket wheel such that said second driving-side sprocket wheel is rotatably mounted to said driving crank axle.

8. The bicycle as set forth in claim 6, wherein a spring member is provided between said second driving-side sprocket wheel and said tightening member to force said second driving-side sprocket wheel and said tightening member apart from each other.

9. The bicycle as set forth in claim 6, wherein said tightening member is provided with a magnetic portion such that said tightening member attracts said engaging member.

10. The bicycle as set forth in claim 2, wherein said tightening member is provided with a magnetic portion such that said tightening member attracts said engaging member.

11. The bicycle as set forth in claim 1, wherein said first and second power trains are associated with each other via an interlocking means for setting said first and second power trains into said operative mode wherein only one of said first and second power trains is set to said operative mode at a given time.

12. A bicycle comprising:

a first power train to propel said bicycle forward;

a second power train to propel said bicycle forward and backward;

said second power train including:
a second driving-side sprocket wheel;
driving crank axle;
means for rotatably mounting said second driving-side sprocket to said driving crank axle;
a driven crank axle;
a second driven-side sprocket wheel mounted to said driven crank axle; and
a second endless chain wound around said second driving-side sprocket wheel and said second driven-side sprocket wheel;

mode setting means for setting each of said first and second power trains from a withdrawn mode into an operative mode and vice versa, whereby said bicycle can be used for different purposes; and said mode setting means including:
said second driving-side sprocket wheel defining an engaging hole;
an engaging member slidably mounted to said driving crank axle and slidable in the axial direction of said driving crank axle;
an engaging protrusion provided on said engaging member for engaging said engaging hole and thereby setting said second power train into said operative mode;
a tightening member mounted on said driving axle;
means for positioning said tightening member along the axial direction of said driving crank axle to press said engaging member and secure engaging relationship between said second driving-side sprocket wheel and said engaging member by insertion of said engaging protrusion into said engaging hole; and
a spring member provided between said second driving-side sprocket wheel and said tightening member to force said second driving-side sprocket wheel and said tightening member apart from each other.

13. The bicycle as set forth in claim 12, wherein said first and second power trains are associated with each other via an interlocking means for setting said first and second power trains into said operative mode wherein only one of said first and second power trains is set to said operative mode at a given time.

\* \* \* \* \*